US008431840B2

(12) United States Patent
Hörnstein

(10) Patent No.: US 8,431,840 B2
(45) **Date of Patent: *Apr. 30, 2013**

(54) SUPPORT ELEMENT WITH WEIGHT MEASUREMENT FOR LIFTING PLATFORMS

(75) Inventor: Roland Hörnstein, Pfalzgrafenweiler (DE)

(73) Assignee: Roland Hörnstein GmbH & Co., KG, Pfalzgrafenweiler (DE)

( * ) Notice: Subject to any disclaimer, the term of this patent is extended or adjusted under 35 U.S.C. 154(b) by 320 days.

This patent is subject to a terminal disclaimer.

(21) Appl. No.: 12/741,920

(22) PCT Filed: Nov. 7, 2008

(86) PCT No.: PCT/DE2008/001846

§ 371 (c)(1), (2), (4) Date: May 7, 2010

(87) PCT Pub. No.: WO2009/062477

PCT Pub. Date: May 22, 2009

(65) Prior Publication Data

US 2010/0276212 A1 Nov. 4, 2010

(30) Foreign Application Priority Data

Nov. 12, 2007 (DE) ........................ 10 2007 053 757

(51) Int. Cl.

| | |
|---|---|
| ***B66F 7/28*** | (2006.01) |
| ***B66F 17/00*** | (2006.01) |
| ***G01G 19/02*** | (2006.01) |
| ***G01G 5/04*** | (2006.01) |

(52) U.S. Cl.

USPC ............ 177/141; 177/146; 177/208; 177/254

(58) Field of Classification Search .................. 177/141, 177/146, 208, 209, 254

See application file for complete search history.

(56) References Cited

U.S. PATENT DOCUMENTS 2,022,203 A * 11/1935 Hughes .................... 73/862.581
2,646,272 A * 7/1953 Swift ............................ 177/141

(Continued)

FOREIGN PATENT DOCUMENTS

DE 29 37 582 A1 4/1981
DE 93 12 286 U1 10/1993
EP 0 631 976 A1 1/1995

OTHER PUBLICATIONS

International Search Report for corresponding International Application No. PCT/DE2008/001846 mailed Jun. 5, 2009.
Form PCT/ISA/237 for International Application No. PCT/DE2008/001846 dated Jun. 5, 2009.

*Primary Examiner* — Randy W Gibson

(74) *Attorney, Agent, or Firm* — Renner, Otto, Boisselle & Sklar, LLP

(57) ABSTRACT

Support element for lifting platforms, which can be arranged between a carrying element of the lifting platform and a vehicle which is to be raised, wherein the support element can be removed from the carrying element, wherein the support element rests on at least one vertically displaceable transfer element that seals a pressure chamber that is filled with hydraulic fluid and is disposed above said transfer element, with the transfer element generating in the pressure chamber a pressure that is characteristic for the weight resting on the support element, and in that the pressure chamber has an annular recess, in particular a groove, which is sealed by the equally annular transfer element.

8 Claims, 3 Drawing Sheets

U.S. PATENT DOCUMENTS

| | | | | | |
|---|---|---|---|---|---|
| 3,080,018 | A | * | 3/1963 | Sinclair | 187/219 |
| 3,200,897 | A | | 8/1965 | Gibbons | |
| 4,055,227 | A | * | 10/1977 | Brackett | 177/208 |
| 4,450,906 | A | * | 5/1984 | Firmin | 166/113 |
| 4,583,620 | A | * | 4/1986 | Bishop | 187/219 |
| 4,716,979 | A | * | 1/1988 | Bradley et al. | 177/208 |
| 5,803,206 | A | * | 9/1998 | Halstead et al. | 187/208 |
| 2010/0263942 | A1 | * | 10/2010 | Hornstein | 177/208 |

* cited by examiner

SUPPORT ELEMENT WITH WEIGHT MEASUREMENT FOR LIFTING PLATFORMS

TECHNICAL FIELD OF INVENTION

This invention relates to a support element with weight measurement for lifting platforms. Lifting platforms are used, among others, in automobile repair shops in order to raise vehicles for the purpose of repair and maintenance. The invention is described with reference to an automobile lifting platform.

Automobile lifting platforms are equipped with a wide variety of load-receiving elements for raising the vehicles. Most frequently, pivoting arms or longitudinally and/or laterally adjustable flat beams are used as load-receiving elements. The vehicles are usually raised at four points or locations. When supporting vehicles, it is important, on the one hand, to support the vehicles safely, i.e. at the correct locations on the underside of the vehicle. On the other hand, the maximum load capacity of the lifting platform or of a single carrying arm or support beam must not be exceeded.

In the field, vehicles are not always supported in accordance with the center of gravity of the vehicle—i.e. in a centered position—but frequently with the load distributed towards one side. Among others, this eccentric raising with uneven load distribution is caused by the circumstance that it improves the desired accessibility to the vehicle for certain operations, and that it makes it easier to perform maintenance and repair work without obstruction. This off-center raising involves sources of dangers that may lead to the impermissible loading of the lifting platform and the vehicle falling off the lifting platform.

DISCUSSION OF RELATED ART

The patent disclosure DE 29 37 582 A1 describes a lifting platform, specifically a dual-column lifting platform for automobiles where force measuring devices are arranged on the bearing elements whose output signals are fed into a downstream safety circuit that compares the signals with voltage values that are proportional to permissible loads and actuates an alarm and/or braking device if the permissible voltage values are exceeded. The system known from DE 29 37 582 A1 is a component of the lifting platform. For example, it can not be applied to lifting platforms that are already in operation. Also, this system is very complex and therefore also very expensive.

The utility model DE 93 12 286.1 describes a lifting platform with a plurality of carrying arms where, at the free ends of said carrying arms, removable support plates or similar devices are arranged on which sensors, switches, or similar devices detecting weight loads or one-sided loads are arranged that are connected to a display device, monitoring device, or a similar device. It is a disadvantage that a power supply is required, in the form of batteries or solar cells, or via radar and reflecting surfaces.

The patent disclosure U.S. Pat. No. 3,200,897 describes a hydraulic weight scale carried by trucks that is intended for mobile operation at different locations. Via a tilting platform, the truck can be driven onto the weight scale and the wheel load or, when several weight scales are used simultaneously, the axle load or the total weight can be measured during the loading process or during weight checks performed by the authorities. The weight scale consists of a cylinder housing with a strong bottom surface with which it rests on the ground. On the upper side, the cylinder housing has an opening. From this opening, a solid plunger piston protrudes vertically. Below the plunger piston, there is a hydraulic fluid that indicates a pressure commensurate with the wheel load resting on it. This weight scale has the disadvantage that the plunger piston is made of solid material. Specifically, it is not possible to arrange a passage or a threaded bore inside the plunger piston in which a vehicle support element could be housed whose height is adjustable, for example by means of a threaded spindle.

SUMMARY OF THE INVENTION

This invention addresses the problem of improving the handling and the safety of lifting platforms. It is intended to show the operator in an easily recognizable manner whether all support points of the vehicle rest with sufficient weight on the load-receiving element. In addition, it will be recognizable that neither an individual carrying arm and/or an individual support point of the load-receiving element is overloaded or that the maximum load capacity of the lifting platform itself has been exceeded. In particular, it will make it possible to retrofit this new safety standard even on older and already installed lifting platforms without requiring modifications of or changes on these lifting platforms.

Furthermore, the weight measurement will be possible without the supply of external energy, in particular without a power supply, so that a very inexpensive manufacture and retrofitting of lifting platforms becomes possible.

According to the invention, this is achieved by means of a support element with weight measurement for lifting platforms according to claim 1. Advantageous embodiments and advanced implementations are subject of the dependent claims.

The support element for lifting platforms according to the invention can be placed between a component of the load-receiving element of the lifting platform and the vehicle to be raised. On its underside with which it makes contact, the support element has at least one recess or groove in which a sealing transfer element sits. Preferably, the sealing transfer element protrudes partially from the support element. This ensures that the imposed weight force of the vehicle is transferred to the load-receiving element only by the transfer element. Above the transfer element, the recess or groove expands further, forming a pressure chamber filled with hydraulic fluid, said pressure chamber being connected to a pressure gauge that can be read from the outside. The weight force exerted by the vehicle on the load-receiving element via the support element and/or the transfer element generates a hydraulic pressure that is characteristic for the vehicle weight.

According to the invention, the recess or the groove as well as the sealing transfer element have an annular shape. The diameter of the annular transfer element should be designed as large as possible. This offers the advantage that, regardless of whether an identical load is applied centrally or eccentrically, approximately the same measured data will be displayed.

It is another advantage of the annular transfer element that components can be passed through the annular surface. For example, it is possible to provide an internally threaded hole in which a height-adjustable vehicle support is located.

In another embodiment, several individual cavities may be arranged in the support element, and may be interconnected by channels, for example, in such a way that even eccentric weight forces can be measured with accuracy.

In a suitable location—preferably on the side of the support element—a pressure gauge, e,g, a manometer, is installed.

This manometer can be scaled to indicate either a pressure or a weight force in relation to the effective pressure surface.

Depending on the requirements, different pressure gauges may be connected to the support element. So-called mechanical pressure gauges like tube spring manometers, capsule spring manometers, plate spring manometers or other types of manometers may be connected to the bearing element. This has the advantage that no electric power supply is needed. It is also possible to connect so-called digital manometers, for example with a digital display showing the numeric value with the unit and/or text. Also, digital manometers are available that store measured data and are able to generate acoustic warning signals.

In another embodiment, instead of a pressure gauge, a sealing coupling may be installed, for example a snap coupling or a plug connector. Via this coupling or this connector, a pressure gauge may be connected—directly or indirectly via a connecting line—if a pressure or weight force measurement is required. This offers the advantage that only one pressure gauge is required for an individual lifting platform, and also that a single pressure gauge can be used for several lifting platforms.

This invention offers the advantage that the weight is measured in a very simple way at all support points on which a vehicle rests on the load-receiving element of a lifting platform. If a part of the load-receiving element is overloaded, or if no vehicle weight or too little vehicle weight rests on another part of the load-receiving element, a correction may be made and the vehicle can be supported in a secure position so that the aforementioned sources of dangers are eliminated. It can also be detected if a vehicle is loaded whose weight exceeds the maximum carrying capacity of the lifting platform.

It is yet another advantage that this support element can be retrofitted to older models of lifting platforms in a very simple way.

Below, the invention is described in detail and explained with reference to the embodiment shown in the drawing.

DETAILED DESCRIPTION OF THE INVENTION

Figure 1:
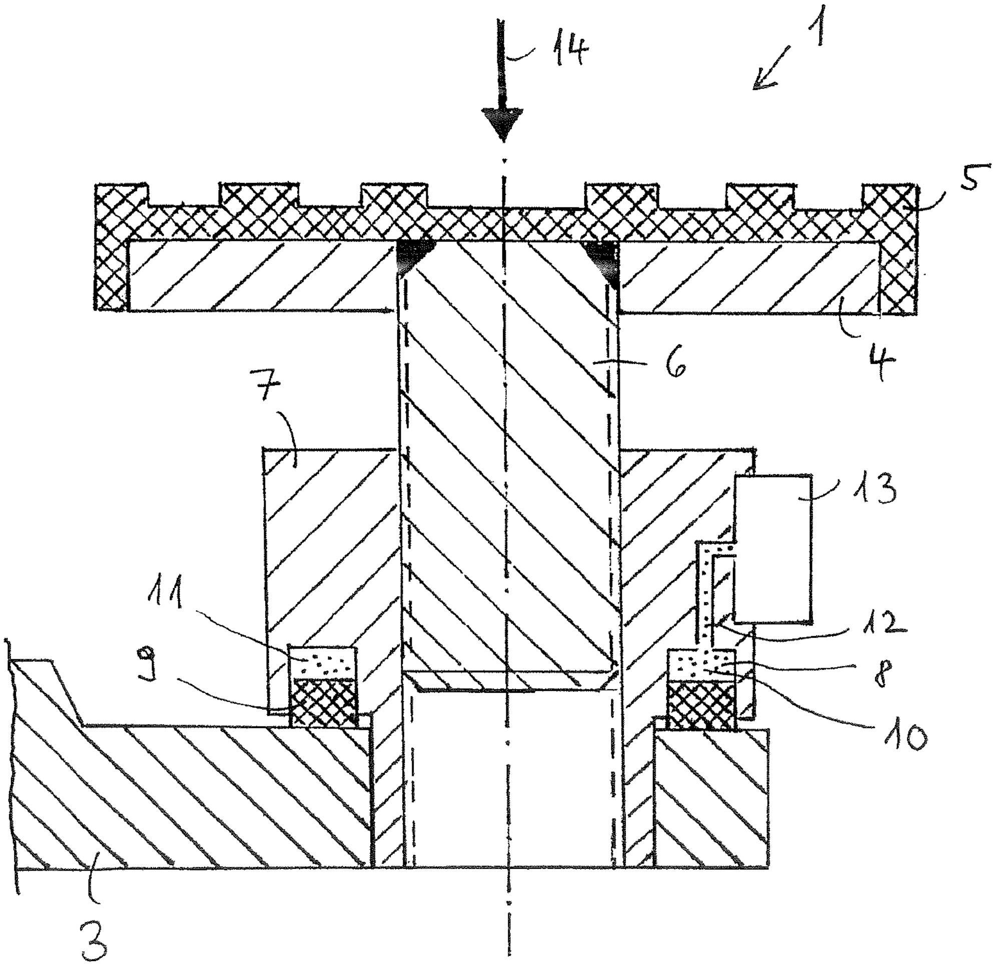
FIG. 1 shows a simplified, schematic, not-to-scale axial section view of a support element according to the invention with a pressure gauge that is inserted into a component of the load-receiving element.
Figure 2:
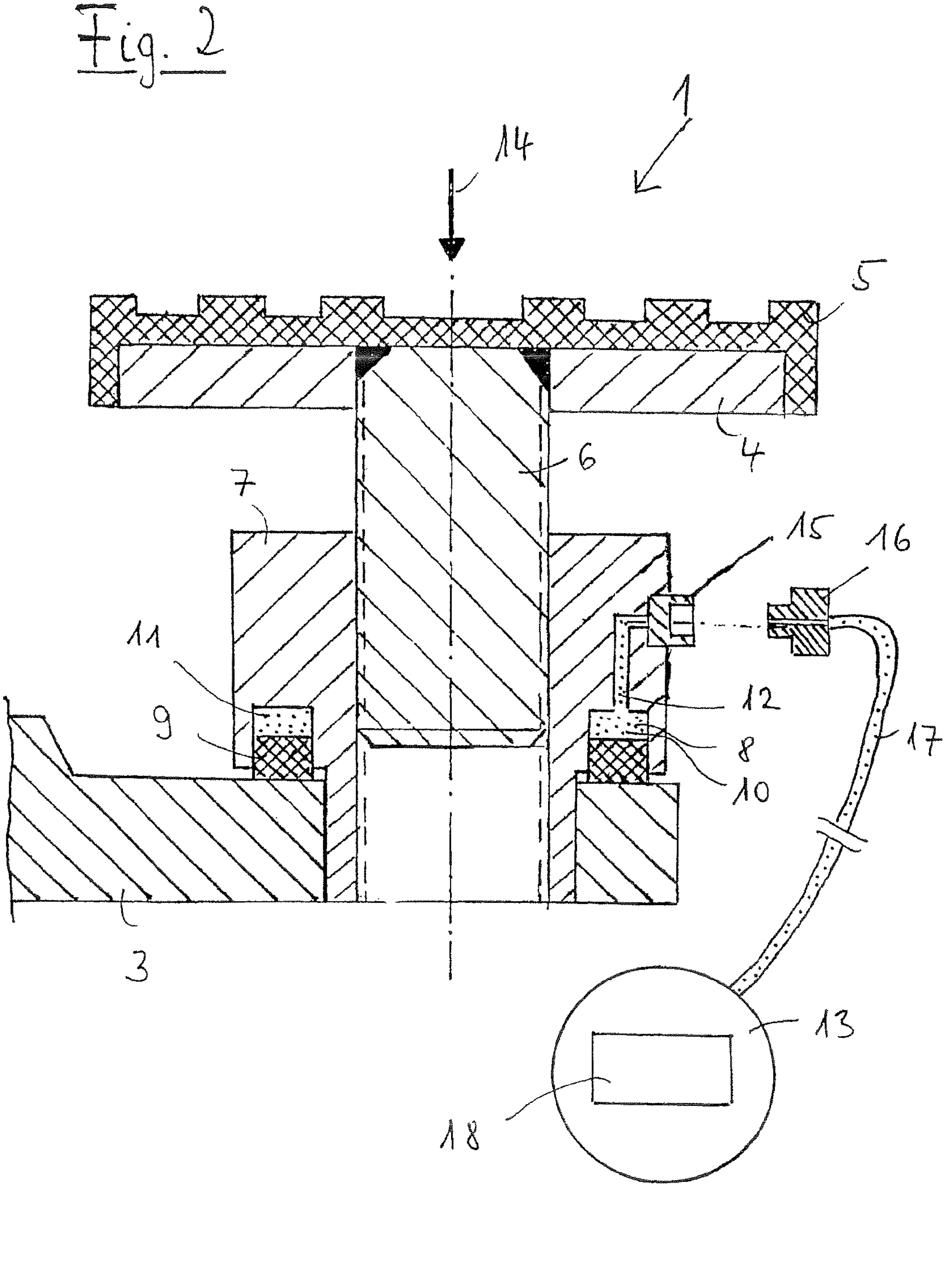
FIG. 2 shows a simplified, schematic, not-to-scale axial section view of a support element according to the invention that is connected the Participant a pressure gauge by means of an intervening pluggable and unpluggable connection, and that is inserted into a component of the load-receiving element.

In an axial section, FIG. 1 and FIG. 2 show a support element 1 that is inserted into a carrying member 3 of a load-receiving element of a lifting platform (not shown) for automobiles. The support plate 4 of the support element 1 is covered with a rubber pad 5 and is made height-adjustable by means of a welded-on threaded spindle. The threaded spindle 6 is therefore supported rotatably in the base body 7 of the support element 1. On the supported underside of the base body 7, an annular groove 8 is located. The groove 8 forms an annular recess. Into this groove 8, a transfer element 9 is fitted that seals the pressure chamber 10. The groove 8 is part of the pressure chamber 10. The pressure chamber 10 is filled with a hydraulic fluid 11. The transfer element 9 protrudes from the groove 8 with a smaller part of its structural height over the entire annular surface, thereby ensuring that the support element 1 rests only with the transfer element 9 on the carrying member 3 of the load-receiving element. The pressure chamber 10 is connected to a pressure gauge 13 via a channel 12. If a weight force 14 is generated at any place on the rubber pad 5 by the raising of a vehicle, said weight force generates—via the support plate 4, the welded-on threaded spindle 6, the base body 7, and the transfer element 9—a pressure in the pressure chamber 10 that is characteristic for the weight force 14, and this pressure is transmitted by the hydraulic fluid 11 and through the channel 12.

In FIG. 1, this pressure is transmitted directly to the pressure gauge 13 where it is made readable via a display.

In FIG. 2, this pressure is present at the female part 15 of a plug connection. This female part 15 provides a hydraulic seal. If a pressure or weight force measurement is desired, the male part 16 that is connected to a pressure gauge 13 by means of a preferably flexible line is connected to the female piece 15 of the plug connection, and the pressure gauge 13 will indicate a pressure or a weight force on the display 18. After the measuring process, the male part 16 can be unplugged again and the pressure gauge with the flexible line 17 can be removed.

Figure 3:
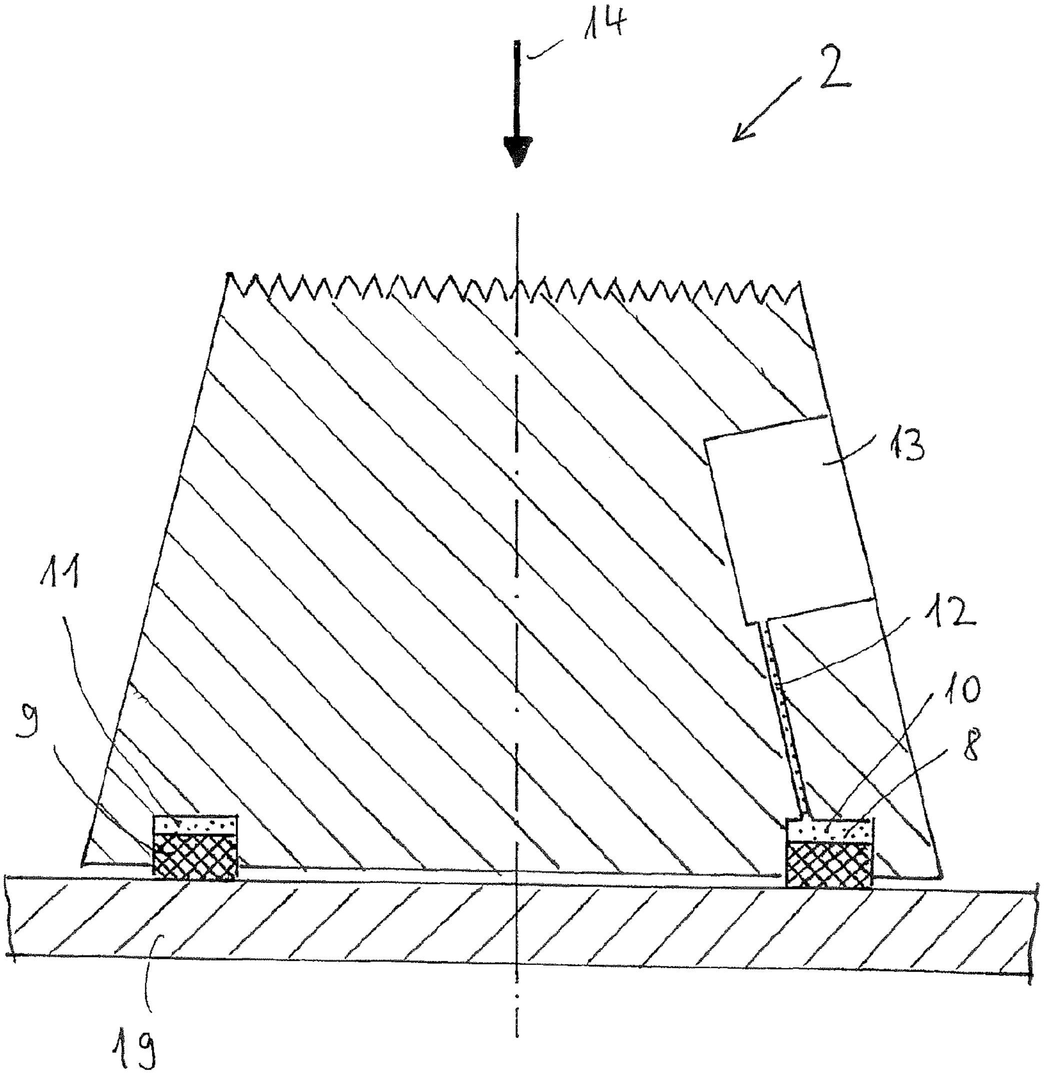
FIG. 3 shows a simplified, schematic, not-to-scale axial section view of a support element according to the invention with a pressure gauge that rests on a load-receiving element.

FIG. 3 shows a support element 2 that has the shape of a truncated pyramid. This support element 2 rests loosely on a flat carrying member 19 of a load-receiving element. On the underside of the support element 2, there is also an annular groove 8. Into this groove 8, a transfer element 9 is fitted that seals the pressure chamber 10. The pressure chamber 10 is filled with a hydraulic fluid 11. The transfer element 9 protrudes from the groove 8 with a smaller part of its structural height over the entire annular surface, thereby ensuring that the support element 2 rests only at the transfer element 9 on the flat carrying member 19 of the load-receiving element. The pressure chamber 10 is connected to a pressure gauge 13 via a channel 12. If a weight force 14 is generated at any place on the upper side of the support element 2 by the raising of a vehicle, said weight force generates, via the transfer element 9, a pressure in the pressure chamber 10 that is characteristic of the weight force 14, and this pressure is transmitted by the hydraulic fluid 11 and through the channel 12 directly to the pressure gauge 13 where it is indicated by means of a display. It would also be possible—analogous to the support element 1 according to FIG. 2—to attach a plug connection instead of a pressure gauge 13 to the support element 2, and to perform the pressure measurement by means of a pressure gauge 13 connected by means of a preferably flexible line.

LIST OF REFERENCE NUMBERS

1 support element
2 support element
3 carrying member of a load-receiving element
4 support plate
5 rubber pad
6 threaded spindle
7 base body
8 groove/recess
9 transfer element
10 pressure chamber
11 hydraulic fluid
12 channel
13 pressure gauge

14 weight force
15 female piece
16 male piece
17 flexible line
18 display
19 flat carrying member of a load-receiving element

The invention claimed is:

1. A support element for lifting platforms, which can be arranged between a carrying element of the lifting platform and a vehicle which is to be raised, wherein the support element can be removed from the carrying element, wherein the support element rests at least on one annular vertically displaceable transfer element that seals an annular pressure chamber that is filled with hydraulic fluid and is disposed above said transfer element, with the transfer element generating in the pressure chamber a pressure that is characteristic of the weight force resting on the support element, and in that the pressure chamber has an annular recess which is sealed by the equally annular transfer element.

2. A support element according to claim 1, wherein the annular recess has the shape of a groove and that the pressure chamber has at least one channel for pressure measurements.

3. A support element according to claim 1, wherein the pressure generated in the pressure chamber is directly transmitted to a pressure gauge, or indirectly via a female part, a male part and an intervening flexible line, and is displayed there.

4. A support element for lifting platforms, which can be arranged between a carrying element of the lifting platform and a vehicle which is to be raised, wherein the support element can be removed from the carrying element, wherein the support element rests at least on one vertically displaceable transfer element that seals a pressure chamber that is filled with hydraulic fluid and is disposed above said transfer element, with the transfer element generating in the pressure chamber a pressure that is characteristic of the weight force resting on the support element, and in that the pressure chamber has an annular recess which is sealed by the equally annular transfer element, wherein the transfer element sits only partially in the recess that is part of the pressure chamber, with the transfer element protruding from the recess with a smaller portion of its structural height.

5. A support element according to claim 1, wherein on the base body of the support element, the hydraulic fluid is sealed towards the outside by a female part or a male part of a plug connection.

6. A support element for lifting platforms, which can be arranged between a carrying element of the lifting platform and a vehicle which is to be raised, wherein the support element can be removed from the carrying element, wherein the support element rests at least on one vertically displaceable transfer element that seals a pressure chamber that is filled with hydraulic fluid and is disposed above said transfer element, with the transfer element generating in the pressure chamber a pressure that is characteristic of the weight force resting on the support element, and in that the pressure chamber has an annular recess which is sealed by the equally annular transfer element, wherein the pressure gauge is completely or partially embedded in the support element.

7. A support element according to claim 4, wherein the displaceable transfer element is annular and the pressure chamber is annular.

8. A support element according to claim 6, wherein the displaceable transfer element is annular and the pressure chamber is annular.

* * * * *